(12) United States Patent
Zhu (10) Patent No.: US 8,811,299 B2
(45) Date of Patent: Aug. 19, 2014

(54) TECHNIQUES FOR REQUESTING BANDWIDTH ALLOCATION

(75) Inventor: Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 12/584,934

(22) Filed: Sep. 15, 2009

(65) Prior Publication Data

US 2011/0064034 A1    Mar. 17, 2011

(51) Int. Cl.
*H04W 4/00* (2009.01)
*H04W 72/04* (2009.01)
*H04W 72/12* (2009.01)

(52) U.S. Cl.
CPC .......... *H04W 72/04* (2013.01); *H04W 72/1284* (2013.01)
USPC ....................................................... 370/329

(58) Field of Classification Search
CPC .......................... H04W 72/04; H04W 72/1284
USPC ....................................................... 370/329
See application file for complete search history.

(56) References Cited

U.S. PATENT DOCUMENTS

| 2007/0104221 A1* | 5/2007 | Venkatachalam ............. 370/468 |
| 2007/0253379 A1 | 11/2007 | Kumar et al. |
| 2008/0233964 A1 | 9/2008 | McCoy et al. |
| 2010/0215002 A1* | 8/2010 | Kim et al. ..................... 370/329 |
| 2010/0280832 A1* | 11/2010 | Ojala et al. .................... 704/500 |

FOREIGN PATENT DOCUMENTS

| EP | 1686822 A1 | 8/2006 |
| EP | 1686822 A1 | 8/2006 |
| JP | 2008533805 A | 8/2008 |
| JP | 2008263611 A | 10/2008 |
| JP | 2010529707 A | 8/2010 |
| RU | 2012112435 A | 10/2013 |
| TW | I419522 B | 12/2013 |
| WO | WO-2008136640 A2 | 11/2008 |
| WO | 2011/034662 A2 | 3/2011 |

OTHER PUBLICATIONS

NPL document IEEE Std 802.16e, Part 16: Air Interface for Fixed and Mobile Broadband Wireless Access Systems, Corrigendum 1, dated Feb. 28, 2006.*
International Search Report and Written Opinion received for PCT Patent Application No. PCT/US2010/044107, mailed on Apr. 12, 2011, 9 pages.
"European Application Serial No. 10817618.1, Office Action mailed Apr. 24, 2012", 2 pgs.
"International Application Serial No. PCT/US2010/044107, International Preliminary Report on Patentability mailed Mar. 20, 2012", 5 pgs.
"International Application Serial No. PCT/US2010/044107, International Search Report mailed Apr. 12, 2011", 3 pgs.
"International Application Serial No. PCT/US2010/044107, Written Opinion mailed Apr. 12, 2011", 4 pgs.

(Continued)

*Primary Examiner* — Chirag Shah
*Assistant Examiner* — Majid Esmaeilian
(74) *Attorney, Agent, or Firm* — Schwegman Lundberg & Woessner (57) ABSTRACT

Techniques for requesting uplink bandwidth. The request can include a request for bandwidth that will be received at a specified delay from when the request was transmitted. Accordingly, the requested uplink bandwidth may be available at a future time when needed by an application or other logic.

19 Claims, 4 Drawing Sheets

(56) References Cited

OTHER PUBLICATIONS 802.16e-2005 and IEEE Std 802.16-2004/Cor1-2005—IEEE Standard for Local and Metropolitan Area Networks Part 16: Air Interface for Fixed and Mobile Broadband Wireless Access Systems Amendment 2: Physical and Medium Access Control Layers for Combined Fix, Related Information : Corrigendum to IEEE Std 802.16-2004 (Revision of IEEE Std 802.16-2001), (2006).
"Japanese Application Serial No. 2012-582797, Office Action mailed May 7, 2013".
"Japanese Application Serial No. 2012-528797, Office Action mailed Dec. 3, 2013", 5 pgs.
"Japanese Application Serial No. 2012-528797, Response filed Jun. 20, 2013 to Office Action mailed May 7, 2013", 18 pgs.
"Korean Application Serial No. 2012-7008203, Notice of Allowance mailed Jan. 27, 2014", 3 pgs.
"Korean Application Serial No. 2012-7008203, Office Action mailed Jul. 8, 2013", 6 pgs.
"Taiwanese Application Serial No. 099124543, Office Action mailed Mar. 29, 2013", 19 pgs.
"Taiwanese Application Serial No. 099124543, Response filed Jul. 1, 2013 to Office Action mailed Mar. 29, 2013", 8 pgs.

* cited by examiner

TECHNIQUES FOR REQUESTING BANDWIDTH ALLOCATION

FIELD

The subject matter disclosed herein relates generally to techniques for requesting bandwidth on a wireless network.

RELATED ART

Figure 1:
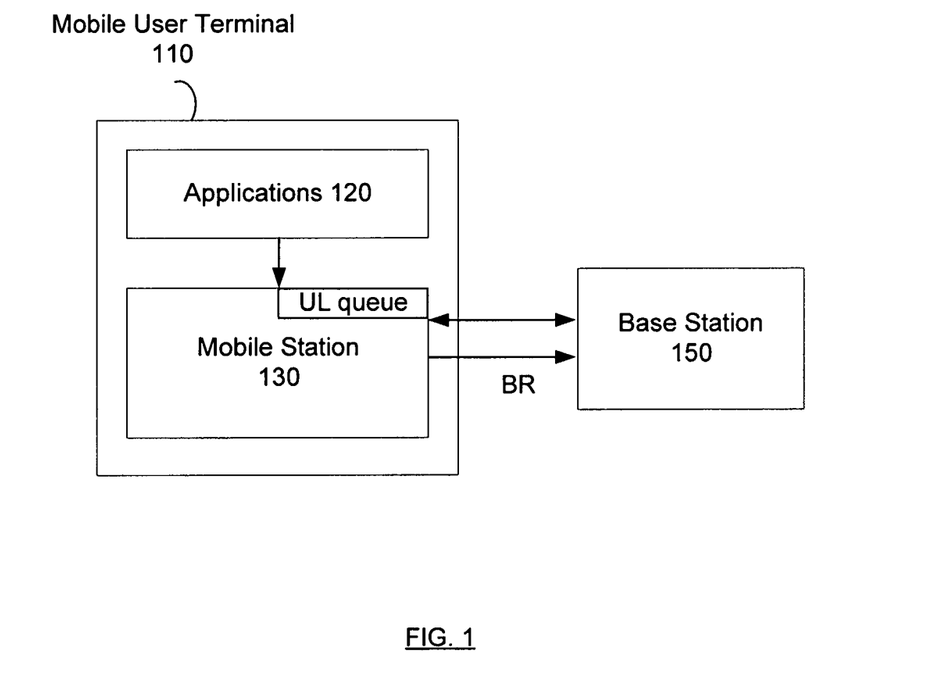
FIG. 1 depicts a wireless communications system.

FIG. 1 depicts a system, in which a mobile station 130 and applications 120 are collocated in mobile user terminal 110. Mobile user terminal 110 may be a cell phone, laptop, or other handheld computing device. Applications 120 generate traffic, and traffic is stored in the uplink (UL) queue of mobile station 130. For example, an application requests storage of at least one packet to the UL queue. Mobile station 130 transmits bandwidth requests to base station 150 for uplink bandwidth to transmit one or more packets from the UL queue. There are two main types of bandwidth requests: management message and contention.

The IEEE 802.16 Bandwidth Request (BR) mechanism allows mobile station 130 to indicate the bandwidth request in a management message, such as the 16-bit Grant Management Subheader (GMSH). If mobile station 130 requests more bandwidth in a bandwidth request (BR) than the size of the packets that are currently in the UL queue, the uplink bandwidth grant from base station 150 may arrive earlier than future packets, which gives more uplink bandwidth than needed to transmit packets. Excess uplink bandwidth may be unused and thereby wasted. It is undesirable to waste uplink bandwidth. In some cases, if mobile station 130 requests bandwidth only for what is currently in the UL queue, there may be no bandwidth request opportunities when a future packet arrives in the UL queue. In such case, mobile station 130 may use less efficient contention-based bandwidth requests.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11 h, 802.11i, and 802.11n.

Various embodiments provide for a delayed bandwidth request that includes a delayed grant size and offset time for when the delayed grant is requested. Such request for bandwidth at the offset time may prevent over-allocation of uplink bandwidth at the offset time. Over-allocation of uplink bandwidth may be undesirable if it involves bandwidth not being utilized and thus being wasted.

Figure 2:
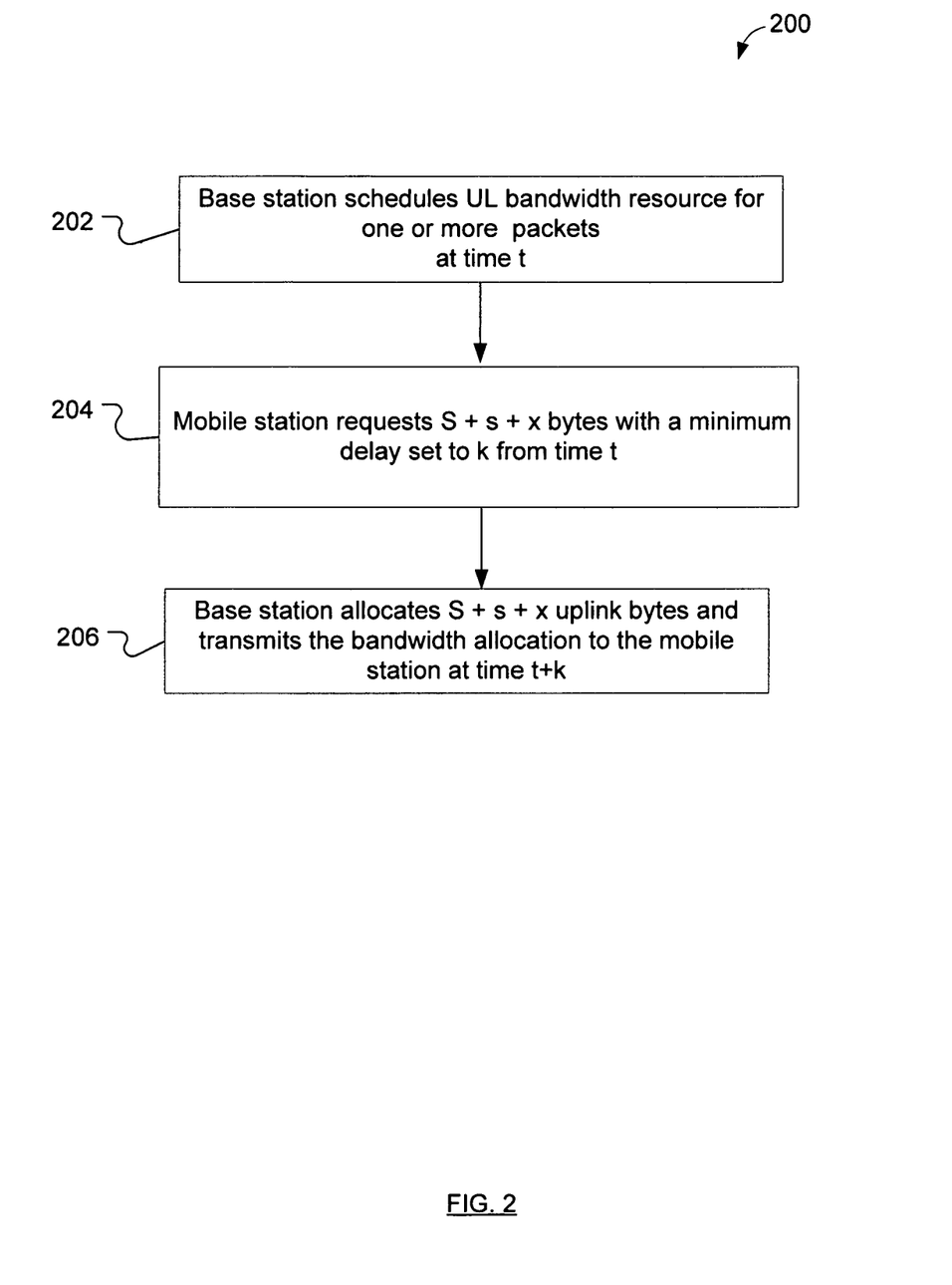
FIG. 2 depicts a process to request bandwidth, in accordance with an embodiment.

FIG. 2 depicts a process to request bandwidth, in accordance with an embodiment. Block 202 includes the base station scheduling uplink (UL) bandwidth resources for a mobile station to transmit packets at time t. The UL bandwidth resource was requested prior to time t. The provided UL bandwidth resource permits the packets in the UL queue to be transmitted at time t. The packets in the UL queue may be transmitted to the base station.

Block 204 includes the mobile station requesting S+s+x bytes using a bandwidth request message. Variable S represents the additional bytes for transmission of one or more packets that will be available for transmission from the uplink queue at a delay of k from time t. Variable s represents the size of a bandwidth request message. For example, variable is set to 2 bytes if a Grant Management Subheader (GMSH) is used to transmit the bandwidth request message. Variable x represents the number of bytes in the UL queue after transmission of one or more packets at time t. For example, if the uplink queue is empty after transmission of contents of the uplink queue at time t, then variable x is zero. The bandwidth request in block 204 can be transmitted in a 16-bit GMSH, although other sizes and types of subheaders can be used. The GMSH is used to convey bandwidth information under IEEE 802.16d (2004) or IEEE 802.16e (2005).

In various embodiments, when a mobile station joins the network, message exchange is used to indicate support of delayed bandwidth requests (i.e., bandwidth requests that request S+s+x bytes at a delay of k). If delayed bandwidth request is supported as a mandatory feature, such initialization may not be needed.

In cases where the base station is not able to process requests for delayed bandwidth allocation, both S and k are set to zero. In various embodiments, the bandwidth request S+s+x is 8 bits in length, although other lengths can be used.

Variable k can be represented by:

$$k = \text{ceiling}((p+T-t)/Tf) + c,$$

where:
p indicates the last (i.e., most recent packet that arrived in UL queue) packet arrival time from the application to the mobile station's UL queue,
T is the maximum inter-packet arrival time to the uplink queue, provided by the application to mobile station a priori,
t indicates the current time,
Tf indicates the duration of a frame, e.g. 5 ms, and
c represents the frame sequence number (FSN) of the current frame at a time when k is determined and may not be later than when the delayed bandwidth request is transmitted.

The units of variable k are in terms of a frame sequence number.

In various embodiments, the bandwidth request for S+s+x can be made in the first 8 bits of the 16-bit PiggyBack Request (PBR) field of the GMSH subheader. In various embodiments, the delay value k can be transmitted in the remaining 8 bits of the PiggyBack Request (PBR) field of the GMSH subheader. In various embodiments, the delay value k is an 8 bit value and can be stored as the least significant bits (LSB) of the FSN.

In various embodiments, an application predicts when the application will transmit packets and the size of transmitted packets. For example, an application can be an internet browser, an electronic mail program, or logic that transmits packets. In various embodiments, the application determines values and T. In various embodiments, a media access control logic of the mobile station calculates k based on the procedure described earlier. Value x can be determined by the application based on the size of contents of the UL queue.

Future bandwidth requests may depend on the type of the application. For example, the traffic arrival of a voice application is much more predictable than that of web browsing and can be determined based on the voice codec being used.

For example, for a voice call, at time t, an uplink allocation of 82 bytes is received and 100 bytes are in the uplink queue. Accordingly, 20 bytes are remaining in the uplink queue after use of the uplink allocation of 82 bytes. At time t, the bandwidth request with S+s+x is provided, where S=100 bytes, s=2 bytes, and x=20 bytes. In voice calls, 100 bytes will be used at time t+k because the traffic rate is predictable.

For example, for video transmission, at time t, an uplink allocation of 82 bytes is received and 100 bytes are in the uplink queue. At time t, the bandwidth request with S+s+x is provided, where S=100 bytes, s=2 bytes, and x=20 bytes. In video transmission, a minimum packet size can be predicted as opposed to the exact packet size. Accordingly, variable S represents a minimum packet size based on an average amount of video traffic.

If multiple applications request bandwidth at the same time, k is set to the maximum of k from all applications and S as the sum of S values from the multiple applications.

In block 206, the base station allocates a bandwidth of S+s+x and transmits the allocation to the mobile station at time t+k. The allocated bandwidth of S+s+x can be indicated in a resource allocation message from the base station, such as, but not limited to, UL-MAP in IEEE 802.16e (2005).

Figure 3:
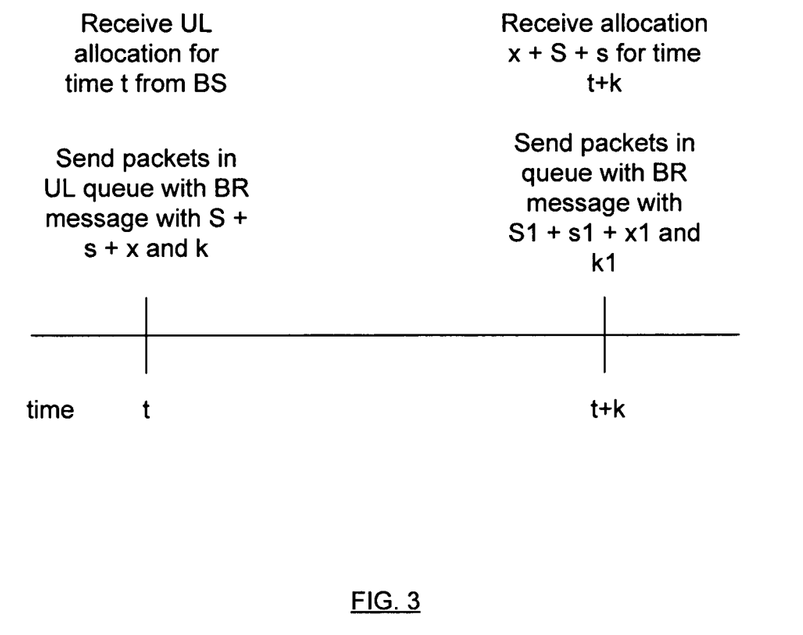
FIG. 3 depicts an example of bandwidth allocation and bandwidth requests in accordance with an embodiment.

FIG. 3 depicts an example of bandwidth allocation and bandwidth requests in accordance with an embodiment. At time t, a mobile station receives an uplink bandwidth allocation for time t from a base station. In addition, at time t, the mobile station transmits packets from a queue in accordance with the bandwidth allocation at time t. The packet includes a bandwidth request with a request for S+s+x bytes at a delay of k from time t. The mobile station may receive the bandwidth allocation of x at time t+k or before time t+k.

At time t+k, the mobile station receives an uplink bandwidth allocation of S+s+x bytes. The mobile station transmits one or more packets using the allocated S+x byte uplink bandwidth allocation. In addition, the one or more transmitted packets also include a bandwidth request for S1+s1+x1 at a delay of k1 from t+k. Variable S1 represents the additional bytes for transmission of one or more packets that will be available for transmission from the uplink queue at a delay of k1 from time t+k. Variable s1 represents the size of a bandwidth request message. Variable x1 represents the number of bytes in the UL queue after transmission of one or more packets at time t+k.

Figure 4:
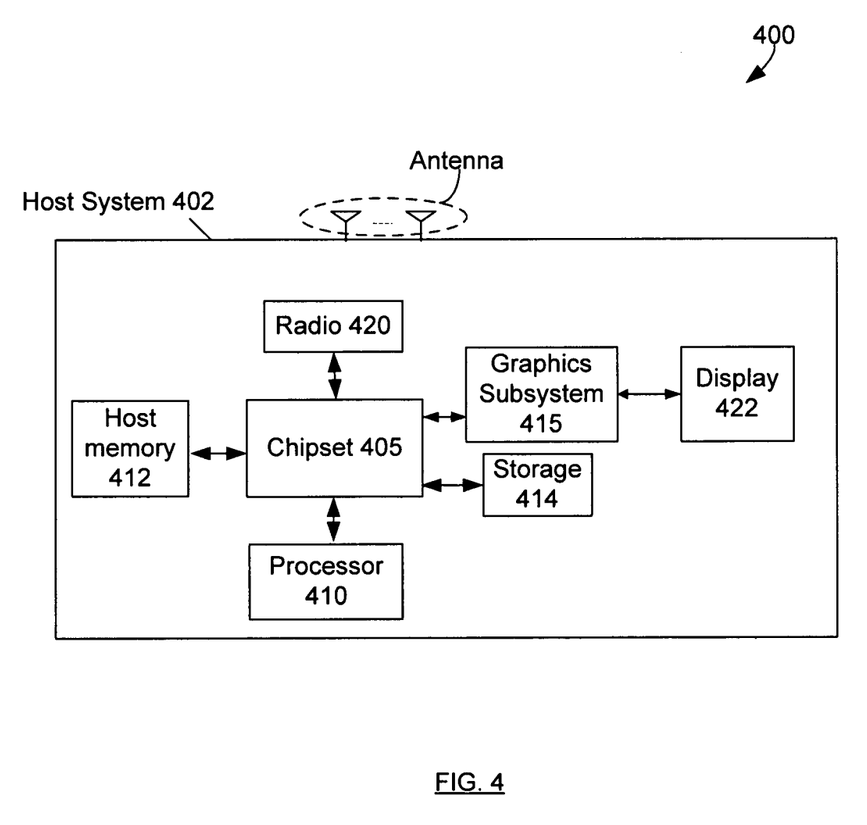
FIG. 4 depicts an example system that can use embodiments of the present invention.

FIG. 4 depicts an example system that can use embodiments of the present invention. Computer system 400 may include host system 402 and display 422. Computer system 400 can be implemented in a handheld personal computer, mobile telephone, set top box, or any computing device. Host system 402 may include chipset 405, processor 410, host memory 412, storage 414, graphics subsystem 415, and radio 420. Chipset 405 may provide intercommunication among processor 410, host memory 412, storage 414, graphics subsystem 415, and radio 420. For example, chipset 405 may include a storage adapter (not depicted) capable of providing intercommunication with storage 414. For example, the storage adapter may be capable of communicating with storage 414 in conformance with any of the following protocols: Small Computer Systems Interface (SCSI), Fibre Channel (FC), and/or Serial Advanced Technology Attachment (S-ATA).

Processor 410 may be implemented as Complex Instruction Set Computer (CISC) or Reduced Instruction Set Computer (RISC) processors, multi-core, or any other microprocessor or central processing unit.

Host memory 412 may be implemented as a volatile memory device such as but not limited to a Random Access Memory (RAM), Dynamic Random Access Memory (DRAM), or Static RAM (SRAM). Storage 414 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 415 may perform processing of images such as still or video for display. An analog or digital interface may be used to communicatively couple graphics subsystem 415 and display 422. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

Radio 420 may include one or more radios capable of transmitting and receiving signals in accordance with applicable wireless standards such as but not limited to any version of IEEE 802.11 and IEEE 802.16. In various embodiments, radio 420 performs techniques described with regard to FIGS. 2 and 3 to request uplink bandwidth from a base station. For example, radio 420 may include at least a physical layer interface and media access controller.

Although techniques were described with respect to regard to wireless bandwidth, the techniques for requesting uplink bandwidth can be used to request bandwidth using a wired communications such as but not limited to those based on IEEE 802.3.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:

generating, by a mobile station without prompting by a base station to make an uplink delayed bandwidth request, a request for uplink delayed bandwidth to be allocated by the base station at a specified later time for transmission of packets received in an uplink queue, the request including an indication of an amount of delayed bandwidth being requested;

providing an offset delay associated with the requested uplink delayed bandwidth, wherein the offset delay is determined by the mobile station based on a predicted time until a next packet is expected to be received at the uplink queue and an identification of a current frame; and transmitting the request for the uplink delayed bandwidth, and the determined offset delay in a subheader of a packet;

wherein the offset delay is represented by k and is determined based in part on following relationship:

$$k=\text{ceiling}((p+T-t)/Tf)+c,$$

where:

p represents a last packet arrival time from the application to the mobile station's uplink queue, T represents a maximum inter-packet arrival time to the uplink queue, t represents a current time, Tf represents a frame duration of a frame, and c represents a frame sequence number of a current frame at a time when the offset delay, k, is determined.

2. The method of claim 1, further comprising:

receiving an allocation of the requested uplink delayed bandwidth, wherein the receiving an allocation comprises receiving an allocation at the time of the offset delay from the current time and transmitting one or more packets using the received uplink delayed bandwidth at the time of the offset delay.

3. The method of claim 1, further comprising:

determining an amount of delayed bandwidth to request in the uplink delayed bandwidth request; and determining an amount of the provided offset delay, wherein an application performs the determining the amount of delayed bandwidth to request in the uplink delayed bandwidth request and wherein a media access controller performs the determining the amount of the provided offset delay.

4. The method of claim 3, wherein the application performs a function selected from a group consisting of: voice chat, video streaming, and internet content browsing.

5. The method of claim 3, wherein the determined amount of delayed bandwidth of the uplink delayed bandwidth request is based in part on content of an uplink queue immediately after a time of transmitting at least one packet including content of the uplink queue.

6. The method of claim 3, wherein the determined amount of delayed bandwidth of the uplink delayed bandwidth request is based in part on expected content of an uplink queue at the time of the offset delay from the current time.

7. The method of claim 1, wherein the transmitting the uplink delayed bandwidth request further comprises:

including delayed bandwidth allocation for a size of the delayed bandwidth request.

8. The method of claim 7, wherein the transmitting the uplink delayed bandwidth request further comprises:

transmitting the uplink delayed bandwidth request and the size of the delayed bandwidth request using a Piggy-Back Request (PBR) field and transmitting the offset delay in one of a frame sequence number or the PBR.

9. An apparatus comprising:

logic to provide, without prompting by a base station to make an uplink delayed bandwidth request, a request for uplink delayed bandwidth to be allocated by the base station at a specified later time for transmission of packets received in an uplink queue;

logic to provide an offset delay associated with the requested uplink delayed bandwidth, wherein the offset delay is determined based on a predicted time until a next packet is expected to be received at the uplink queue and an identification of a current frame;

logic to transmit the request for the uplink delayed bandwidth, and the determined offset delay in a subheader of a packet;

wherein the offset delay is represented by k and is determined based in part on following relationship:

$$k=\text{ceiling}((p+T-t)/Tf)+c,$$

where:

p represents a last packet arrival time from the application to the mobile station's uplink queue, T represents a maximum inter-packet arrival time to the uplink queue, t represents a current time, Tf represents a frame duration of a frame, and c represents a frame sequence number of a current frame at a time when the offset delay, k, is determined.

10. The apparatus of claim 9, further comprising:

logic to receive an allocation of the requested uplink delayed bandwidth wherein the allocation comprises an allocation at the time of the offset delay from a current time and logic to transmit one or more packets using the received uplink delayed bandwidth at the time of the offset delay.

11. The apparatus of claim 9, wherein the request includes an amount for the requested uplink delayed bandwidth, and a size of the delayed bandwidth request transmitted in a Piggy-Back Request field.

12. The apparatus of claim 9, wherein the determined offset delay is transmitted in one of a frame sequence number or a PiggyBack Request field.

13. An apparatus comprising:

logic to receive from a mobile station a subheader of a packet, the subheader including a request, from the mobile station without prompting by a base station to make an uplink delayed bandwidth request, for uplink delayed bandwidth to be allocated by the base station at a specified later time, and a determined offset delay and logic to transmit to the mobile station an allocation of the requested uplink delayed bandwidth for transmitting by the mobile station at a time based on the determined offset delay wherein the offset delay is represented by k and is determined based in part on following relationship:

$$k=\text{ceiling}((p+T-t)/Tf)+c,$$

where:

p represents a last packet arrival time from the application to the mobile station's uplink queue, T represents a maximum inter-packet arrival time to the uplink queue, t represents a current time, Tf represents a frame duration of a frame, and c represents a frame sequence number of a current frame at a time when the offset delay, k, is determined.

14. The apparatus of claim 13, wherein:

the subheader comprises the request for an amount of uplink delayed bandwidth, and a size of the delayed bandwidth request message in a PiggyBack Request field.

15. The apparatus of claim 13, wherein the determined offset delay is transmitted in one of a frame sequence number or a PiggyBack Request field.

16. A system comprising:

a display device;

a radio;

a microprocessor communicatively coupled to the display device and the radio; and the microprocessor programmably configured to:

provide, without prompting by a base station to make an uplink delayed bandwidth request, a request for a determined amount of uplink delayed bandwidth to be allocated by the base station at a specified later time for transmission of packets received in an uplink queue and provide an offset delay associated with the requested uplink delayed bandwidth, wherein the offset delay is determined based on a predicted time until a next packet is expected to be received at the uplink queue and an identification of a current frame; and the radio comprising:

logic to transmit the request for the uplink delayed bandwidth, and the determined offset delay in a subheader of a packet;

wherein the offset delay is represented by k and is determined based in part on following relationship:

$$k=\text{ceiling}((p+T-t)/Tf)+c,$$

where:

p represents a last packet arrival time from the application to the mobile station's uplink queue, T represents a maximum inter-packet arrival time to the uplink queue, t represents a current time, Tf represents a frame duration of a frame, and c represents a frame sequence number of a current frame at a time when the offset delay, k, is determined.

17. The system of claim 16, wherein the determined amount of the uplink delayed bandwidth request is based in part on content of an uplink queue immediately after a time of transmitting at least one packet including content of the uplink queue.

18. The system of claim 16, wherein the determined amount of the uplink delayed bandwidth is based in part on expected content of an uplink queue at the determined offset delay from a current time.

19. The system of claim 16, wherein the subheader comprises the request for the uplink delayed bandwidth, and a size of the delayed bandwidth request message in a PiggyBack Request field.

* * * * *

UNITED STATES PATENT AND TRADEMARK OFFICE
CERTIFICATE OF CORRECTION

| | |
|---|---|
| PATENT NO. | : 8,811,299 B2 |
| APPLICATION NO. | : 12/584934 |
| DATED | : August 19, 2014 |
| INVENTOR(S) | : Jing Zhu |

It is certified that error appears in the above-identified patent and that said Letters Patent is hereby corrected as shown below:

In the Claims

In column 6, line 38, in Claim 2, after "time", insert --;--, therefor

In column 7, line 3, in Claim 8, after "field", insert --;--, therefor

In column 7, line 37, in Claim 10, after "time", insert --;--, therefor

In column 7, line 53, in Claim 13, after "delay", insert --;--, therefor

In column 7, line 57, in Claim 13, after "delay", insert --;--, therefor

In column 8, line 26, in Claim 16, after "queue", insert --;--, therefor

Signed and Sealed this
Twenty-fifth Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,811,299 B2 | Page 1 of 1 |
| APPLICATION NO. | : 12/584934 | |
| DATED | : August 19, 2014 | |
| INVENTOR(S) | : Zhu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 709 days.

Signed and Sealed this
Twenty-first Day of July, 2015

Michelle K. Lee
*Director of the United States Patent and Trademark Office*